() United States Patent  
Hooker et al.

(10) Patent No.: US 8,392,666 B2  
(45) Date of Patent: Mar. 5, 2013

(54) LOW POWER HIGH SPEED LOAD-STORE COLLISION DETECTOR

(75) Inventors: Rodney E. Hooker, Austin, TX (US); Colin Eddy, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 686 days.

(21) Appl. No.: 12/582,591

(22) Filed: Oct. 20, 2009

(65) Prior Publication Data

US 2010/0299484 A1 Nov. 25, 2010

Related U.S. Application Data

(60) Provisional application No. 61/180,294, filed on May 21, 2009.

(51) Int. Cl.
| | |
|---|---|
| G06F 12/00 | (2006.01) |
| G06F 13/00 | (2006.01) |
| G06F 13/28 | (2006.01) |
| G06F 15/00 | (2006.01) |
| G06F 9/30 | (2006.01) |
| G06F 9/40 | (2006.01) |
| G06F 7/38 | (2006.01) |
| G06F 9/00 | (2006.01) |
| G06F 9/44 | (2006.01) |

(52) U.S. Cl. ........ 711/150; 711/158; 711/168; 712/205; 712/216; 712/224

(58) Field of Classification Search .................. 711/150, 711/158, 168; 712/205, 216, 224  
See application file for complete search history.

(56) References Cited

U.S. PATENT DOCUMENTS

| | | | |
|---|---|---|---|
| 6,799,265 B1 * | 9/2004 | Dakhil | 712/217 |
| 2006/0010304 A1 * | 1/2006 | Homewood et al. | 711/201 |
| 2007/0101106 A1 * | 5/2007 | Senter et al. | 712/225 |
| 2007/0126059 A1 * | 6/2007 | Dembo et al. | 257/344 |
| 2008/0082738 A1 * | 4/2008 | Cypher et al. | 711/108 |
| 2008/0307173 A1 * | 12/2008 | Yeh et al. | 711/157 |
| 2009/0083488 A1 * | 3/2009 | Gimeno et al. | 711/118 |
| 2010/0250850 A1 * | 9/2010 | Yang et al. | 711/118 |

* cited by examiner

*Primary Examiner* — Christian P Chace  
*Assistant Examiner* — Ryan Bertram  
(74) *Attorney, Agent, or Firm* — Gary Stanford; James W. Huffman

(57) ABSTRACT

An apparatus detects a load-store collision within a microprocessor between a load operation and an older store operation each of which accesses data in the same cache line. Load and store byte masks specify which bytes contain the data specified by the load and store operation within a word of the cache line in which the load and data begins, respectively. Load and store word masks specify which words contain the data specified by the load and store operations within the cache line, respectively. Combinatorial logic uses the load and store byte masks to detect the load-store collision if the data specified by the load and store operations begin in the same cache line word, and uses the load and store word masks to detect the load-store collision if the data specified by the load and store operations do not begin in the same cache line word.

21 Claims, 4 Drawing Sheets

LOW POWER HIGH SPEED LOAD-STORE COLLISION DETECTOR

CROSS REFERENCE TO RELATED APPLICATION(S)

This application claims priority based on U.S. Provisional Application, Ser. No. 61/180,294, filed May 21, 2009, entitled LOW POWER HIGH SPEED LOAD-STORE COLLISION DETECTOR, which is hereby incorporated by reference in its entirety.

FIELD OF THE INVENTION

The present invention relates in general to microprocessors, and more particularly to the detection of load-store collisions therein.

BACKGROUND OF THE INVENTION

In the context of a pipelined microprocessor design, a situation can occur such that a newer load operation overlaps with an older store operation in memory. That is, one or more bytes of the store data are destined for a memory location that is also within the source memory location specified by the load. FIG. 1 shows an example in which a 32-bit (dword) store operation to memory address 0x1234 is followed in program sequence by a 16-bit (halfword) load operation from memory address 0x1236. Because the load operation specifies at least one byte of its source memory location that is the same as the destination memory location specified by the store operation, they overlap.

In some cases, the microprocessor is able to forward the store data directly to the load, which is referred to as store forwarding operation, and is generally advantageous to performance. However, in other cases, the load has to wait on the store to commit to memory to get the data, which is referred to as a load-store collision situation. For example, the load and store may not both be to memory regions with a writeback cacheable memory trait, or the load is not able to receive all of its data from the store or a combination of the store and cache. A load-store collision is generally disadvantageous to performance, but must be detected.

Typically, to determine load-store collisions, processors do some type of address compare combined with byte overlap detection. The address compare is typically a cache line compare or sometimes a cache index, but could be finer granularity. The finer the granularity, the larger the address comparators required, which typically translates into more power consumed and more time required for the comparators to do the compare. Some implementations compare cache line addresses. This means the byte overlap detection needs to calculate whether any bytes of the load collide with any bytes of the store within the 64-byte cacheline of which the address compare generates a match. (See FIG. 2 for illustration of the 16 dwords of a 64-byte cache line, each dword containing 4 bytes aligned on a 4-byte address boundary.) As an example, the largest memory operation (i.e., load/store, also referred to herein as a memop) size of a microarchitecture may be 16 bytes, which is smaller than the size of a cacheline. Conventionally, the byte overlap detection would be accomplished by generating or storing a 16-bit byte mask for each memop (each byte implicated by the load or store has its corresponding bit set), shifting the byte mask of the load and store to their respective position within the cacheline, and then checking to see if any bits of the two byte masks overlap, which indicates that the load and store specify at least one common byte position within the cache line. If so, a load-store collision condition exists.

The conventional byte overlap detection scheme would do one of the following for every memop: (1) store 64-bit byte masks that already have the 16-bit byte masks pre-shifted to their proper position within the cache line; (2) store 16-bit byte masks and shift them on the fly; or (3) generate 16-bit byte masks and shift on the fly. Each of these conventional byte overlap detection schemes has its pluses and minuses, but they all have problems. Storing the pre-shifted byte masks (scheme 1) requires a relatively large amount of hardware. Generating and shifting the byte masks on the fly (scheme 3) introduces timing problems and can have negative power implications. Scheme 2 is a compromise that still introduces timing problems because it requires shifting on the fly, although less than scheme 3 because it does not require generating the byte masks on the fly, and still requires the additional hardware to store the byte masks, although less than scheme 1. A potential 1-to-48 position shift and then a 64-bit mask compare operation is a significant amount of hardware and may be a timing issue. Generally speaking, dealing with a full 64-bit cacheline vector is a problem.

BRIEF SUMMARY OF INVENTION

In one aspect, the present invention provides a hardware apparatus for detecting a load-store collision within a microprocessor between a load operation and an older store operation each of which accesses data in the same cache line. The apparatus includes a load byte mask that specifies which bytes contain the data specified by the load operation within a word of the cache line in which the load data begins, a store byte mask that specifies which bytes contain the data specified by the store operation within a word of the cache line in which the store data begins, a load word mask that specifies which words contain the data specified by the load operation within the cache line, and a store word mask that specifies which words contain the data specified by the store operation within the cache line. The apparatus also includes combinatorial logic configured to use the load and store byte masks to detect the load-store collision if the data specified by the load and store operations begin in the same word of the cache line, and configured to use the load and store word masks to detect the load-store collision if the data specified by the load and store operations do not begin in the same word of the cache line.

In another aspect, the present invention provides a method performed by a hardware apparatus for detecting a load-store collision within a microprocessor between a load operation and an older store operation each of which accesses data in the same cache line. The method includes determining whether the data specified by the load operation and the data specified by the store operation begin in the same word of the cache line. A word comprises a plurality of bytes. The method also includes using byte masks to detect the load-store collision, if the data specified by the load operation and the data specified by the store operation begin in the same word of the cache line. The method also includes using word masks to detect the load-store collision, if the data specified by the load operation and the data specified by the store operation do not begin in the same word of the cache line.

In another aspect, the present invention provides a computer program product for use with a computing device, the computer program product comprising a computer usable storage medium, having computer readable program code embodied in said medium, for specifying a hardware apparatus for detecting a load-store collision within a microprocessor between a load operation and an older store operation each of which accesses data in the same cache line. The computer readable program code includes first program code for specifying a load byte mask that specifies which bytes contain the data specified by the load operation within a word of the cache line in which the load data begins. The computer readable program code also includes second program code for specifying a store byte mask that specifies which bytes contain the data specified by the store operation within a word of the cache line in which the store data begins. The computer readable program code also includes third program code for specifying a load word mask that specifies which words contain the data specified by the load operation within the cache line. The computer readable program code also includes fourth program code for specifying a store word mask that specifies which words contain the data specified by the store operation within the cache line. The computer readable program code also includes fifth program code for specifying combinatorial logic, configured to use the load and store byte masks to detect the load-store collision if the data specified by the load and store operations begin in the same word of the cache line, and configured to use the load and store word masks to detect the load-store collision if the data specified by the load and store operations do not begin in the same word of the cache line.

DETAILED DESCRIPTION OF THE INVENTION

Embodiments described herein advantageously reduce the size of the load-store collision detection working vector by recognizing that load-store collision detection can be imprecise. That is, in order for the microprocessor to be functionally correct it must detect every load-store collision condition; however, the microprocessor can still be functionally correct and signal some false load-store collisions, i.e., situations in which there is not really a load-store collision. Signalling false load-store collisions may negatively impact performance since it may cause some loads to wait longer than necessary. Embodiments described herein trade off some accuracy of detecting load-store collisions, and therefore potentially some performance, in return for better timing, less power consumption and less hardware.

Figure 1:
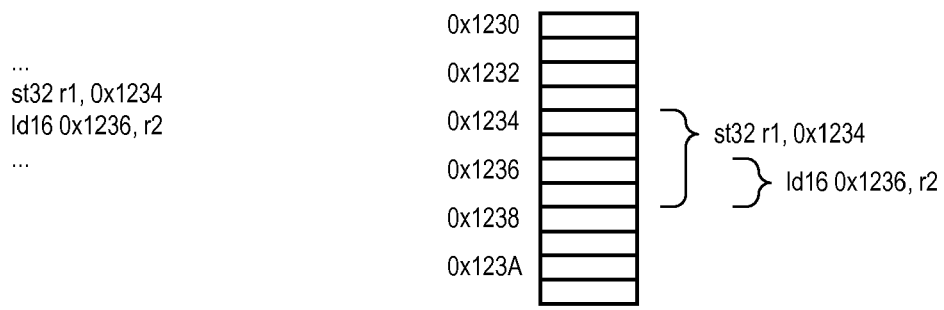
FIG. 1 is a block diagram illustrating an example of a load-store collision.
Figure 2:
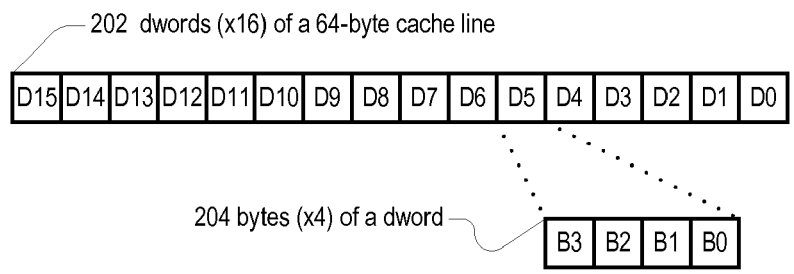
FIG. 2 is a block diagram illustrating words within a cache line and bytes within a word.
Figure 3:
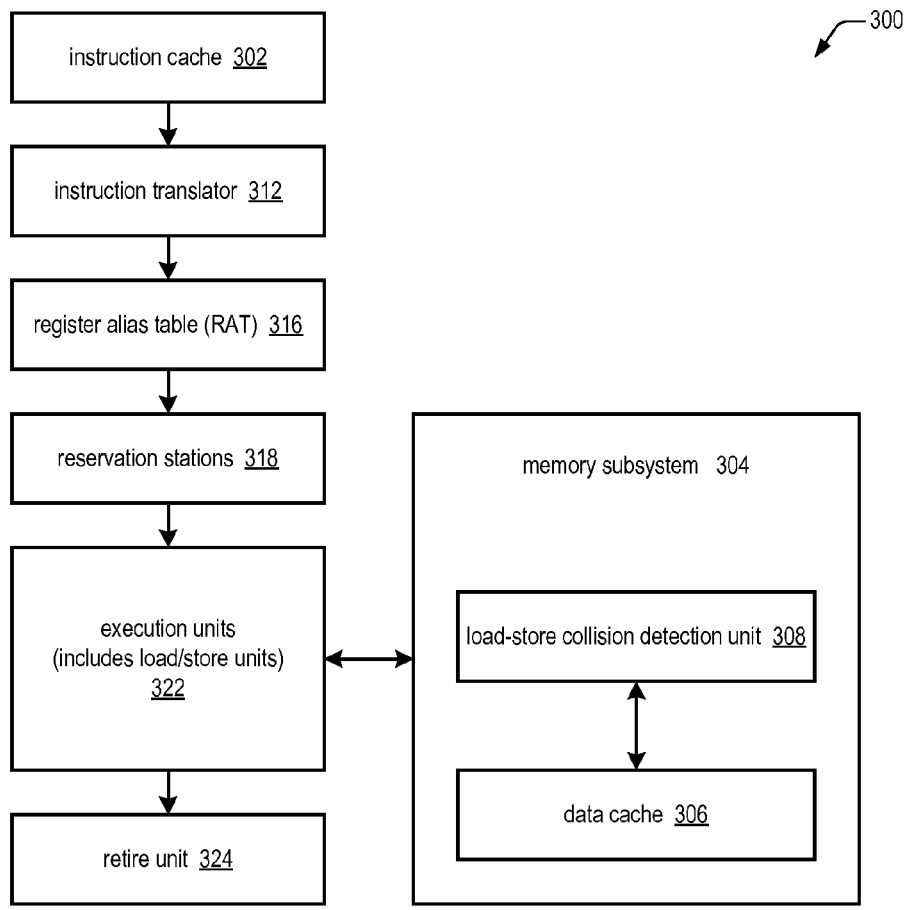
FIG. 3 is a block diagram illustrating a microprocessor that may employ load-store collision detection apparatus embodiments according to the present invention.

Referring now to FIG. 3, a microprocessor 300 that may employ the load-store collision detection apparatus embodiments described herein according to the present invention is shown. The microprocessor 300 includes functional units of an out-of-order execution pipelined microprocessor, including an instruction cache 302, coupled to an instruction translator 312, coupled to a register alias table 316, coupled to reservation stations 318, coupled to execution units 322, coupled to a retire unit 324, as are well-known in the art of microprocessor design. The execution units 322 include one or more load/store units for processing load and store operations. A memory subsystem 304 is coupled to the execution units 322. The memory subsystem 304 includes a data cache 306 coupled to a load-store collision detection unit 308.

Figure 4:
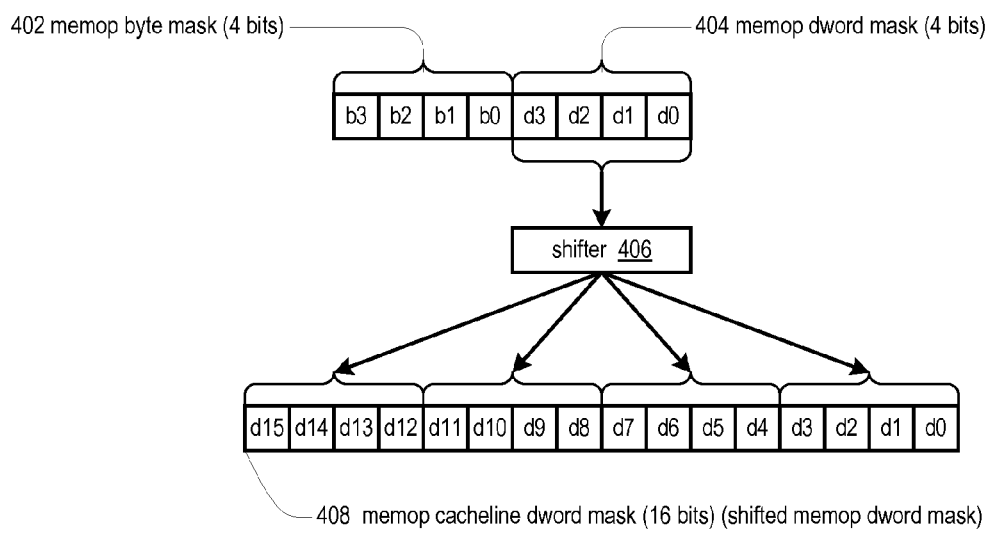
FIG. 4 is a block diagram illustrating a memory operation vector for use by the load-store collision detection unit of FIG. 3 according to the present invention.

Referring now to FIG. 4, a block diagram illustrating a memop vector for use by the load-store collision detection unit 308 according to the present invention is shown. The vector comprises a 4-bit memop byte mask 402 for the first dword of the memop, and a 4-bit memop dword mask 404 for each of the dwords of the memop. Rather than using a full 64-bit byte mask where each byte of the cacheline is represented in the collision detection mechanism as in scheme (1) above, we only store/generate a byte mask 402 for the first dword in which the data begins of the cacheline implicated by each memop. For the remaining dwords of the memop, we store/generate a dword mask 404, rather than a byte mask. The dword mask 404 provides collision detection accuracy at a relatively coarse level, and the byte mask 402 provides increased accuracy for near collisions. Thus, for each memop, the size of our vector is only 8 bits, which is half the number of bits in scheme (2) above. This is particularly beneficial in a vector-storing implementation, and is beneficial in all implementations because it reduces the size of the mask comparators.

The load-store collision detection unit 308 employs a shifter 406 of FIG. 4 that shifts the dword mask 404 to its proper location within a 16-bit memop cacheline dword mask 408 based on the memory address of the memop. The shifter 406 shifts the dword mask 404 to one of four possible positions within the 16-bit memop cacheline dword mask 408, as shown in FIG. 4. This greatly reduces the amount of shifting required over the conventional solutions described above, which may be a significant timing benefit. The remaining bits of the 16-bit memop cacheline dword mask 408 (i.e., the bits into which the dword mask 404 is not shifted) are populated with zeroes. As shown in the embodiment of FIG. 4, the number of bits of the memop dword mask 404 is four bits because the largest memory operation size of the microprocessor 300 microarchitecture is 16 bytes, although other embodiments with different sizes are contemplated, such as 32 byte and 64 byte memops, particularly in a microprocessor 300 with a cache line size larger than 64 bytes.

Figure 5:
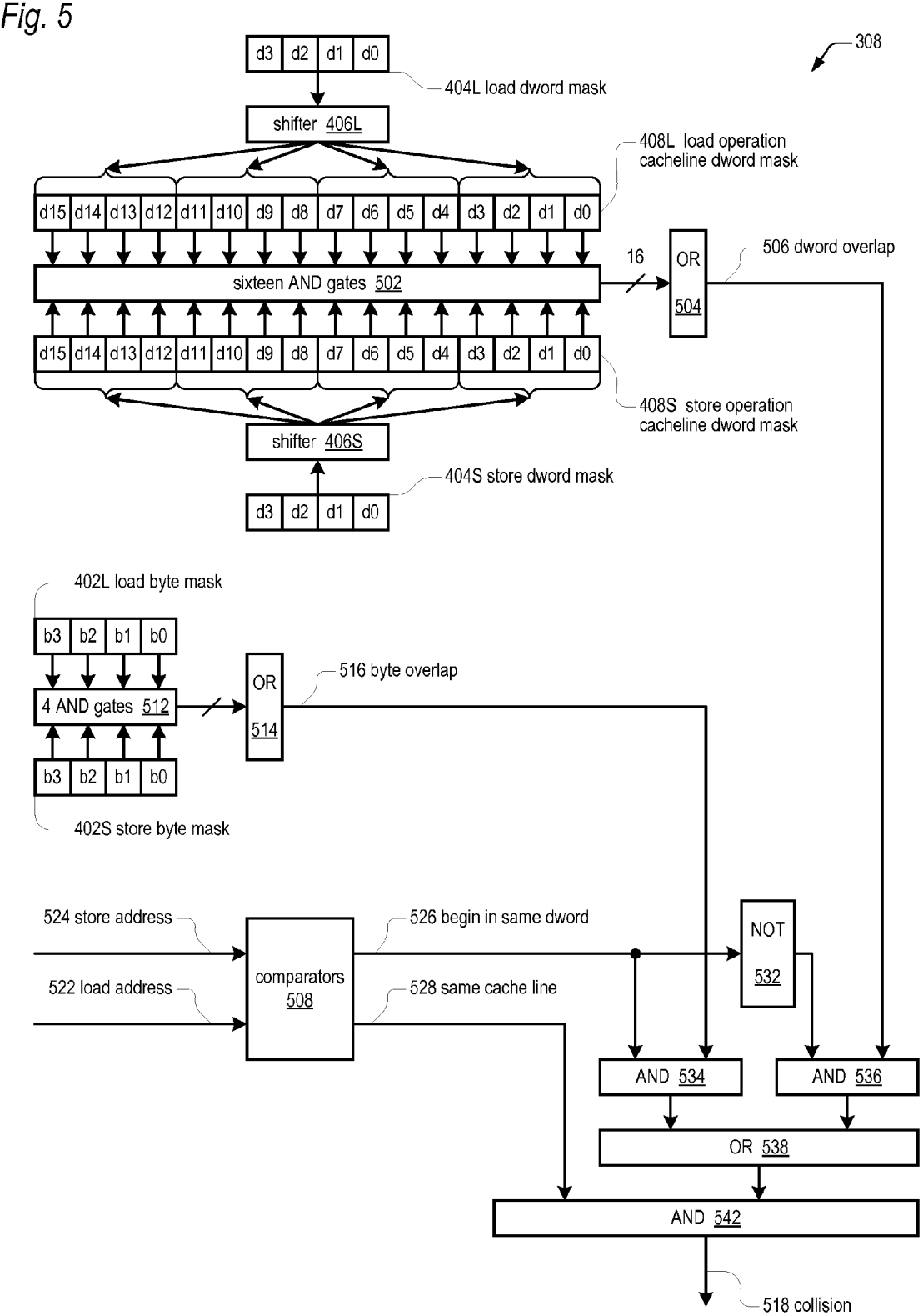
FIG. 5 is a block diagram illustrating the load-store collision detection unit of FIG. 3 according to one embodiment of the present invention.

Referring now to FIG. 5, the load-store collision detection unit 308 of FIG. 3 according to one embodiment of the present invention is shown. The load-store collision detection unit 308 includes sixteen 2-input AND gates 502, each of which receives one input bit from a 16-bit load operation cacheline dword mask 408L similar to the 16-bit memop cacheline dword mask 408 of FIG. 4, which is generated from a load dword mask 404L similar to the dword mask 404 of FIG. 4 by a shifter 406L similar to the shifter 406 of FIG. 4. Each of the AND gates 502 receives a second input bit from a 16-bit store operation cacheline dword mask 408S similar to the 16-bit memop cacheline dword mask 408 of FIG. 4, which is generated from a store dword mask 404S similar to the dword mask 404 of FIG. 4 by a shifter 406S similar to the shifter 406 of FIG. 4. The sixteen outputs of the sixteen AND gates 502 are fed into a 16-input OR gate 504 that outputs a dword overlap signal 506 which is true if any of the corresponding bits of the load operation cacheline dword mask 408L and store operation cacheline dword mask 408S are both true.

The load-store collision detection unit 308 includes four 2-input AND gates 512, each of which receives one input bit from a 4-bit load byte mask 402L similar to the O-bit memop byte mask 402 of FIG. 4. Each of the four AND gates 512 receives a second input bit from 4-bit store byte mask 402S similar to the 4-bit memop byte mask 402 of FIG. 4. The four outputs of the four AND gates 512 are fed into a 4-input OR gate 514 that outputs a byte overlap signal 516 which is true if any of the corresponding bits of the load byte mask 402L and store byte mask 402S are both true.

The load-store collision detection unit 308 also includes comparators 508 that compare a load address 522 with a store address 524 to generate a true value on a same cache line signal 528 if the addresses 522/524 access the same cache line, i.e., if the address bits above bit 5 match. The comparators 508 also generate a true value on a begin in same dword signal 526 if the load address 522 and store address 524 start in the same dword of the cacheline, i.e., if the address bits above bit 1 (i.e., bits [5:2]) match.

A 2-input AND gate 534 receives the begin in same dword signal 526 and the byte overlap signal 516. A 2-input AND gate 536 receives the inverted version of the begin in same dword signal 526 and the dword overlap signal 506. A 2-input OR gate receives the outputs of the AND gate 534 and the AND gate 536. A 2-input AND gate 542 receives the same cache line signal 528 and the output of the OR gate 428 to generate a collision signal 518, which has a true value to indicate a load-store collision. Although only one set of logic for the load-store collision detection unit 308 is shown in FIG. 5, similar logic exists to generate the collision indicator 518 for each older store operation (i.e., each store operation that is older than the load in question), and the multiple collision indicators 518 are ORed together to generate a final collision indicator. Although a particular arrangement of logic gates are shown in the embodiment of FIG. 5, other embodiments are contemplated that accomplish equivalent functionality.

Figure 6:
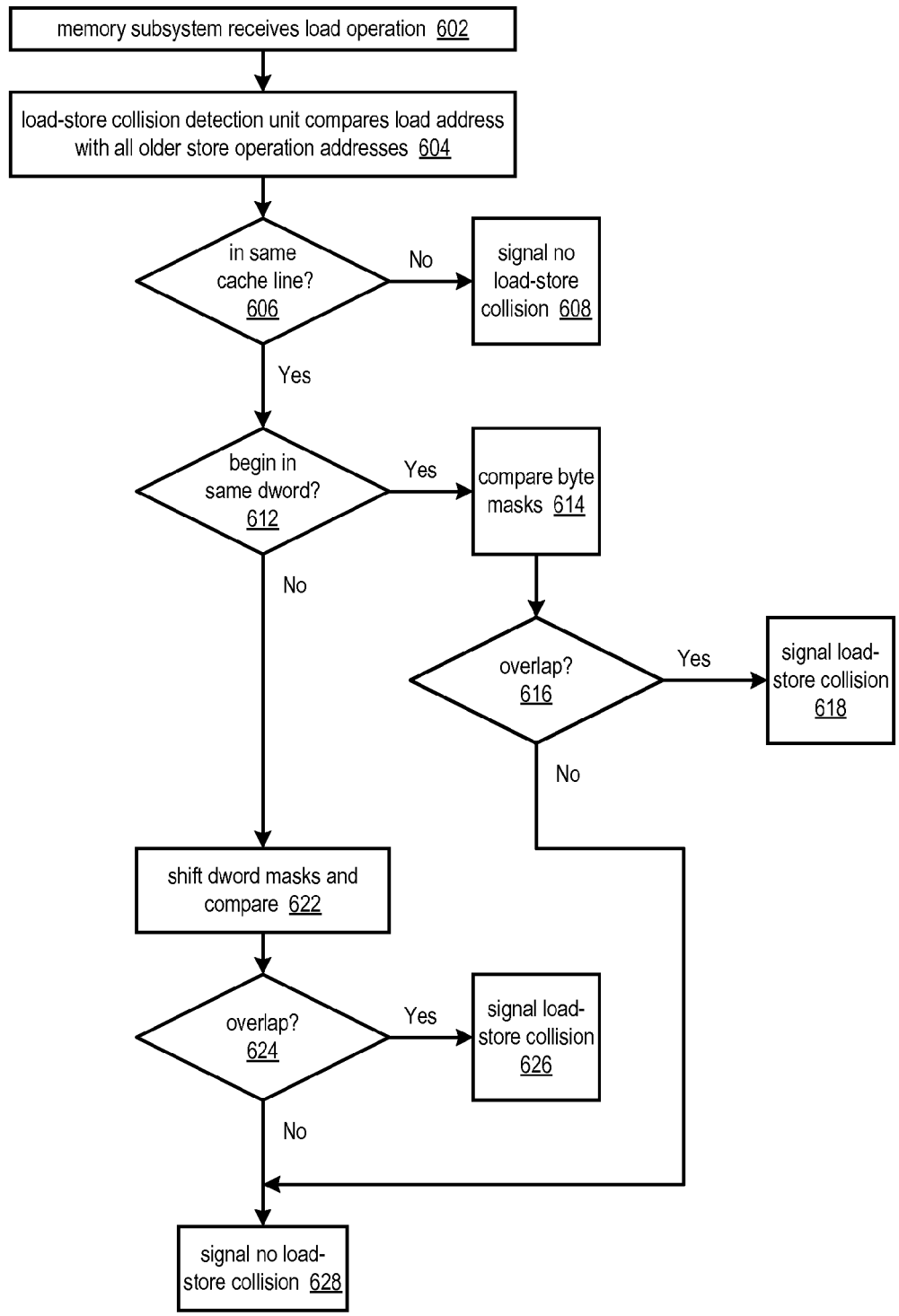
FIG. 6 is a flowchart illustrating operation of the load-store collision detection unit of FIG. 5 according to the present invention.

Referring now to FIG. 6, a flowchart illustrating operation of the load-store collision detection unit 308 of FIG. 5 according to the present invention is shown. Flow begins at block 602.

At block 602, the memory subsystem 304 receives a load operation. Flow proceeds to block 604.

At block 604, the comparators 508 of the load-store collision detection unit 308 compare the load address 552 with the store address 524 of all older store operations. Flow proceeds to decision block 606.

At decision block 606, the load-store collision detection unit 308 examines the same cache line signals 528 to determine whether the load operation is in the same cache line as any of the older store operations. If so, flow proceeds to decision block 612; otherwise, flow proceeds to block 608.

At block 608, the collision signal 518 of load-store collision detection unit 308 signals a false value to indicate no load-store collision. Flow ends at block 608.

At decision block 612, the load-store collision detection unit 308 examines the begin in same dword signals 526 to determine whether the load operation begins in the same dword of the cache line as any of the older store operations. If so, flow proceeds to block 614; otherwise, flow proceeds to block 622.

At block 614, the AND gates 512 compare the byte mask 402L of the load operation with the byte mask 402S of each of the older store operations. Flow proceeds to decision block 616.

At decision block 616, the load-store collision detection unit 308 examines the byte overlap signals 516 to determines whether any of the corresponding bits of the byte mask 402L of the load operation and the byte mask 402S of any of the older store operations are both true. If so, flow proceeds to block 618; otherwise, flow proceeds to block 628.

At block 618, the collision signal 518 of load-store collision detection unit 308 signals a true value to indicate a load-store collision. Flow ends at block 618.

At block 622, the shifter 406L shifts the load dword mask 404L to generate the load operation cacheline dword mask 408L, and the shifters 406S shift the store dword masks 404S of each older store operation to generate the store operation cacheline dword masks 408S. Additionally, the AND gates 502 compare the load operation cacheline dword mask 408L with the store operation cacheline dword mask 408S of each older store operation. Flow proceeds to decision block 624.

At decision block 624, the load-store collision detection unit 308 examines the dword overlap signal 506 to determine whether the load operation cacheline dword mask 408L overlaps with the store operation cacheline dword mask 408S of any older store operation. If so, flow proceeds to block 626; otherwise, flow proceeds to block 628. In an alternate embodiment, the bit in the dword mask 408 for the first dword of the memory operations are not compared (and are not stored/generated) since if the memory operations do not begin in the same dword, then it is known that this bit will not match.

At block 626, the collision signal 518 of load-store collision detection unit 308 signals a true value to indicate a load-store collision. Flow ends at block 626.

At block 628, the collision signal 518 of load-store collision detection unit 308 signals a false value to indicate no load-store collision. Flow ends at block 628.

As may be observed from the foregoing, in exchange for the benefits of reduced number of bits used in the memop vector (less power consumption and less hardware) and the benefits of reduced shifting (better timing), the embodiments described herein forfeit some precision in detecting a load-store collision. If loads and stores are near misses, reducing the precision of the load-store collision detection will flag some false collisions, which may have a performance impact. Other embodiments are contemplated that may be employed to minimize the performance impact based on data access patterns by typical code executed on the microprocessor 300. For example, if the most commonly run code tends to often have near misses in the second dword, the vector could include a byte mask for the first two dwords, rather than just the first dword. Alternatively, the memop vector could employ qword (64-bit) or dqword (128-bit) masks rather than dword masks, to further reduce the size of the vector if the performance impact is acceptable. This embodiment may become acceptable as larger memops are introduced to the instruction set architecture of the microprocessor 300.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A hardware apparatus for detecting a load-store collision within a microprocessor between a load operation and an older store operation each of which accesses data in the same cache line, the apparatus comprising:
    a load byte mask that specifies which bytes contain the data specified by the load operation within a word of the cache line in which the load data begins;
    a store byte mask that specifies which bytes contain the data specified by the store operation within a word of the cache line in which the store data begins;
    a load word mask that specifies which words contain the data specified by the load operation within the cache line;
    a store word mask that specifies which words contain the data specified by the store operation within the cache line; and
    combinatorial logic, configured to use the load and store byte masks to detect the load-store collision if the data specified by the load and store operations begin in the same word of the cache line, and configured to use the load and store word masks to detect the load-store collision if the data specified by the load and store operations do not begin in the same word of the cache line.

2. The apparatus of claim 1, wherein the number of bits of the byte masks is equal to the number of bytes of a word.

3. The apparatus of claim 1, wherein the number of bits of the byte masks is less than the number of bytes of the largest memory operation supported by the microarchitecture of the microprocessor.

4. The apparatus of claim 1, wherein the number of bits of the word masks is equal to the number of words of the largest memory operation supported by the microarchitecture of the microprocessor.

5. The apparatus of claim 1, wherein a word comprises four bytes.

6. The apparatus of claim 1, wherein a word comprises eight bytes.

7. The apparatus of claim 1, wherein a word comprises sixteen bytes.

8. The apparatus of claim 1, wherein the combinatorial logic is configured to indicate a load-store collision if the load and store byte masks indicate a byte overlap within the same word of the cache line in which the load and store data begin and otherwise to indicate no load-store collision.

9. The apparatus of claim 1, wherein the combinatorial logic is configured to indicate a load-store collision if the load and store word masks indicate a word overlap within the cache line and otherwise to indicate no load-store collision.

10. The apparatus of claim 9, wherein the combinatorial logic comprises:
    shifters, configured to shift the load and store word masks to their respective locations within the cache line prior to using the load and store word masks to detect the load-store collision.

11. A method performed by a hardware apparatus for detecting a load-store collision within a microprocessor between a load operation and an older store operation each of which accesses data in the same cache line, the method comprising:
    determining whether the data specified by the load operation and the data specified by the store operation begin in the same word of the cache line, wherein a word comprises a plurality of bytes;
    using byte masks to detect the load-store collision, if the data specified by the load operation and the data specified by the store operation begin in the same word of the cache line; and
    using word masks to detect the load-store collision, if the data specified by the load operation and the data specified by the store operation do not begin in the same word of the cache line.

12. The method of claim 11, wherein the number of bits of the byte masks is equal to the number of bytes of a word.

13. The method of claim 11, wherein the number of bits of the byte masks is less than the number of bytes of the largest memory operation supported by the microarchitecture of the microprocessor.

14. The method of claim 11, wherein the number of bits of the word masks is equal to the number of words of the largest memory operation supported by the microarchitecture of the microprocessor.

15. The method of claim 11, wherein a word comprises four bytes.

16. The method of claim 11, wherein a word comprises eight bytes.

17. The method of claim 11, wherein a word comprises sixteen bytes.

18. The method of claim 11, wherein said using byte masks to detect the load-store collision comprises:
    indicating a load-store collision if the byte masks indicate a byte overlap within the same word of the cache line in which the data specified by the load operation and the data specified by the store operation begin; and
    otherwise indicating no load-store collision.

19. The method of claim 11, wherein said using word masks to detect the load-store collision comprises:
    indicating a load-store collision if the word masks indicate a word overlap within the cache line specified by the load operation and the store operation; and
    otherwise indicating no load-store collision.

20. The method of claim 19, wherein said using word masks to detect the load-store collision further comprises shifting the word masks of the load operation and the store operation to their respective locations within the cache line prior to said indicating a load-store collision if the word masks indicate a word overlap within the cache line specified by the load operation and the store operation.

21. A computer program product for use with a computing device, the computer program product comprising:
    a non-transitory computer usable storage medium, having computer readable program code embodied in said medium, for specifying a hardware apparatus for detecting a load-store collision within a microprocessor between a load operation and an older store operation each of which accesses data in the same cache line, the computer readable program code comprising:

first program code for specifying a load byte mask that specifies which bytes contain the data specified by the load operation within a word of the cache line in which the load data begins;

second program code for specifying a store byte mask that specifies which bytes contain the data specified by the store operation within a word of the cache line in which the store data begins;

third program code for specifying a load word mask that specifies which words contain the data specified by the load operation within the cache line;

fourth program code for specifying a store word mask that specifies which words contain the data specified by the store operation within the cache line; and fifth program code for specifying combinatorial logic, configured to use the load and store byte masks to detect the load-store collision if the data specified by the load and store operations begin in the same word of the cache line, and configured to use the load and store word masks to detect the load-store collision if the data specified by the load and store operations do not begin in the same word of the cache line.

* * * * *